United States Patent
Chen et al.

(10) Patent No.: US 8,961,206 B1
(45) Date of Patent: Feb. 24, 2015

(54) MINI USB CONNECTOR WITH CARD PLUG-IN FUNCTION

(71) Applicant: Sonetek Technology Corp., New Taipei (TW)

(72) Inventors: Ting-Chi Chen, New Taipei (TW); Su-Yung Chou, New Taipei (TW); Yi-Chieh Lin, New Taipei (TW); Te-Fu Lu, New Taipei (TW)

(73) Assignee: Sonetek Technology Corp., New Taipei (TW)

( * ) Notice: Subject to any disclaimer, the term of this patent is extended or adjusted under 35 U.S.C. 154(b) by 0 days.

(21) Appl. No.: 14/020,080

(22) Filed: Sep. 6, 2013

(51) Int. Cl.
*H01R 13/62* (2006.01)
*H01R 13/6581* (2011.01)
*H01R 13/633* (2006.01)
*H01R 13/635* (2006.01)

(52) U.S. Cl.
CPC .......... *H01R 13/6581* (2013.01); *H01R 13/633* (2013.01); *H01R 13/635* (2013.01)
USPC ........................................................ 439/152

(58) Field of Classification Search
CPC .............................. H01R 13/633; H01R 27/00
USPC .................. 439/152–155, 159, 160, 489, 630
See application file for complete search history.

(56) References Cited

U.S. PATENT DOCUMENTS

| | | | |
|---|---|---|---|
| 6,319,029 B2* | 11/2001 | Nishioka | 439/159 |
| 6,749,450 B1* | 6/2004 | Chen | 439/188 |
| 6,890,198 B2* | 5/2005 | Kawahata et al. | 439/188 |
| 7,036,742 B2* | 5/2006 | Learmonth et al. | 235/492 |
| 7,232,321 B1* | 6/2007 | Lai | 439/159 |
| 7,311,537 B2* | 12/2007 | Hsu | 439/188 |

\* cited by examiner

*Primary Examiner* — Phuongchi T Nguyen
(74) *Attorney, Agent, or Firm* — Muncy, Geissler, Olds & Lowe, P.C.

(57) ABSTRACT

A mini USB connector with card plug-in function includes an electrical insulating terminal holder including an accommodation chamber and first and second tongue members bilaterally disposed at a front side of the accommodation chamber, a conducting terminal set including multiple conducting terminals mounted in the accommodation chamber and arranged in three sets, and an EMI shielding shell surrounding the electrical insulating terminal holder and the conducting terminals and defining therein a mating chamber that matches with the accommodation chamber, the first tongue member and the second tongue member to constitute first, second and third insertion spaces respectively for the insertion of different types of electronic cards or electrical connectors.

11 Claims, 9 Drawing Sheets

MINI USB CONNECTOR WITH CARD PLUG-IN FUNCTION

BACKGROUND OF THE INVENTION

1. Field of the Invention

The present invention relates to USB connectors, and more particularly to a mini USB connector with card plug-in function, which is formed of an electrical insulating terminal holder, a conducting terminal set and an EMI shielding shell and defines therein multiple insertion spaces for selectively receiving different types of electronic cards or electrical connectors.

2. Description of the Related Art

Following fast development of computer electronic technology, may high mobility electrical and electronic apparatus are well developed and widely used by people for different applications, bringing convenience to people and making people's life more comfortable. Further, high-speed, high-power and sophisticated mobile electrical and electronic devices and related products with large capacity and low profile characteristics have been continuously created. Further, many different transmission interfaces and connectors are widely used in electrical and electronic products for power and data transmission. For connecting different component parts, different transmission interfaces or connectors of different sizes and configurations must be used. Therefore, an electrical or electronic device needs to provide sufficient installation space for the installation of different types of transmission interfaces and connectors.

Further, it is the market trend to create mobility electronic apparatuses having light, thin, short and small characteristics. In consequence, circuit board electronic components must be made extremely strong, small and precise. Further, many different male and female electrical connectors are used in an electronic apparatus to connect different components and parts to a circuit board for the connection of mating electronic cards and/or connectors. These electrical connectors occupy much circuit layout space of the circuit board and the inside space of the electronic apparatus. It is quite important to fully utilize the circuit layout space of a circuit board and the internal space of an electronic apparatus.

SUMMARY OF THE INVENTION

The present invention has been accomplished under the circumstances in view. It is one object of the present invention to provide a mini USB connector with card plug-in function, which has light, thin, short and small characteristics for a wide range of applications.

To achieve this and other objects of the present invention, a mini USB connector with card plug-in function in accordance with the present invention comprises an electrical insulating terminal holder, a conducting terminal set, and an EMI shielding shell. The electrical insulating terminal holder comprises an accommodation chamber, and a first tongue member and a second tongue member bilaterally disposed in a parallel manner at a front side relative to the accommodation chamber. The conducting terminal set comprises multiple conducting terminals mounted in the accommodation chamber. Each conducting terminal has a contact portion located at one end thereof, and a bonding portion located at an opposite end thereof. The contact portions of one part of the conducting terminal set are disposed to suspend in the accommodation chamber and the contact portions of the other part of the conducting terminal set are positioned in the first tongue member and the second tongue member. The bonding portions of the conducting terminals are arranged in at least one row to suspend outside a rear side of the electrical insulating terminal holder for bonding to an external circuit board. The EMI shielding shell surrounds the electrical insulating terminal holder and the conducting terminals, defining therein a mating chamber that matches with the accommodation chamber, the first tongue member and the second tongue member to constitute first, second and third insertion spaces respectively for the insertion of different types of electronic cards or electrical connectors.

In one example of the present invention, the conducting terminals are numbered from $1^{st}$ through $16^{th}$. The contact portions of the conducting terminals from $1^{st}$ through $6^{th}$ are arranged in two rows to suspend in the accommodation chamber. The contact portions of the conducting terminals from $7^{th}$ through $11^{th}$ are positioned in the first tongue member in a parallel manner. The contact portions of the conducting terminals from $12^{th}$ through $16^{th}$ are positioned in the second tongue member. The bonding portions of the conducting terminals from $1^{st}$ through $16^{th}$ are arranged in at least one row outside the rear side of the electrical insulating terminal holder for bonding to an external circuit board Further, the bonding portions of the conducting terminals can be arranged in two rows outside the rear side of the electrical insulating terminal holder for bonding to an external circuit board using the mounting method of DIP (dual in-line package).

Alternatively, the bonding portions of the conducting terminals can be arranged in one row outside the rear side of the electrical insulating terminal holder for bonding to an external circuit board using the mounting method of SMT (Surface-mount technology).

Preferably, the EMI shielding shell further comprises a plurality of mounting legs that can be harpoon-shaped, frog-leg shaped, fish-eye shaped, seagull leg shaped for bonding to an external circuit board using the mounting method of DIP (dual in-line package). Alternatively, the mounting legs of the EMI shielding shell can be extended in horizontal and configured for bonding to an external circuit board using the mounting method of SMT (Surface-mount technology). Thus, the mini USB connector can be configured for installation in a predetermined circuit board to form a sink board-mounting structure, on-board mounting structure, under-the-board mounting structure or raised mounting structure.

Preferably, the mini USB connector further comprises a card ejector mechanism mounted in the electrical insulating terminal holder and operable to eject an inserted electronic card out of the electrical insulating terminal holder. In this case, the electrical insulating terminal holder further comprises a receiving space transversely defined near an opposing rear side relative to the accommodation chamber, an upright pivot pin located in the receiving space, a longitudinal sliding groove extending along one lateral side of the accommodation chamber, and a recess defined between the longitudinal sliding groove and the second tongue member. Further, the card ejector mechanism comprises a swinging push bar and a sliding push bar. The swinging push bar comprises a push portion perpendicularly extended from one flat end thereof, an upright bearing portion extended from a curved opposite end thereof, and a pivot hole spaced between the push portion and the upright bearing portion and pivotally coupled to the upright pivot pin in the receiving space. The sliding push bar is slidably coupled to the longitudinal sliding groove of the electrical insulating terminal holder, comprising an actuation portion located at one end thereof and stopped against the upright bearing portion of the swinging push bar and an operating portion perpendicularly extended from an opposite end thereof and movable with the sliding push bar in the recess. By means of pressing the operating portion of the sliding push bar to turn the swinging push bar about the upright pivot pin, the card ejector mechanism ejects the inserted electronic card out of the electrical insulating terminal holder.

DETAILED DESCRIPTION OF THE PREFERRED EMBODIMENT

Figure 1:
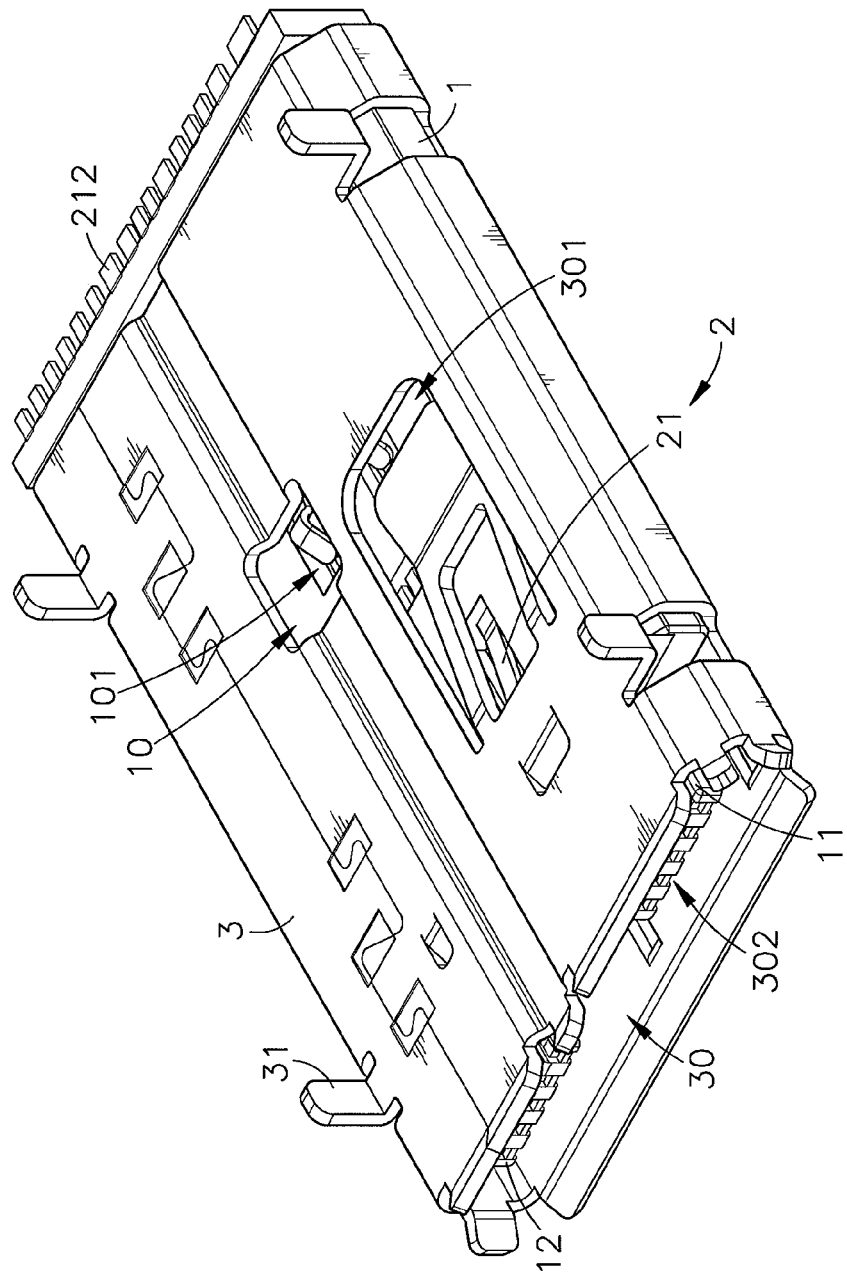
FIG. 1 is an oblique top elevation of a mini USB connector with card plug-in function in accordance with a first embodiment of the present invention.
Figure 2:
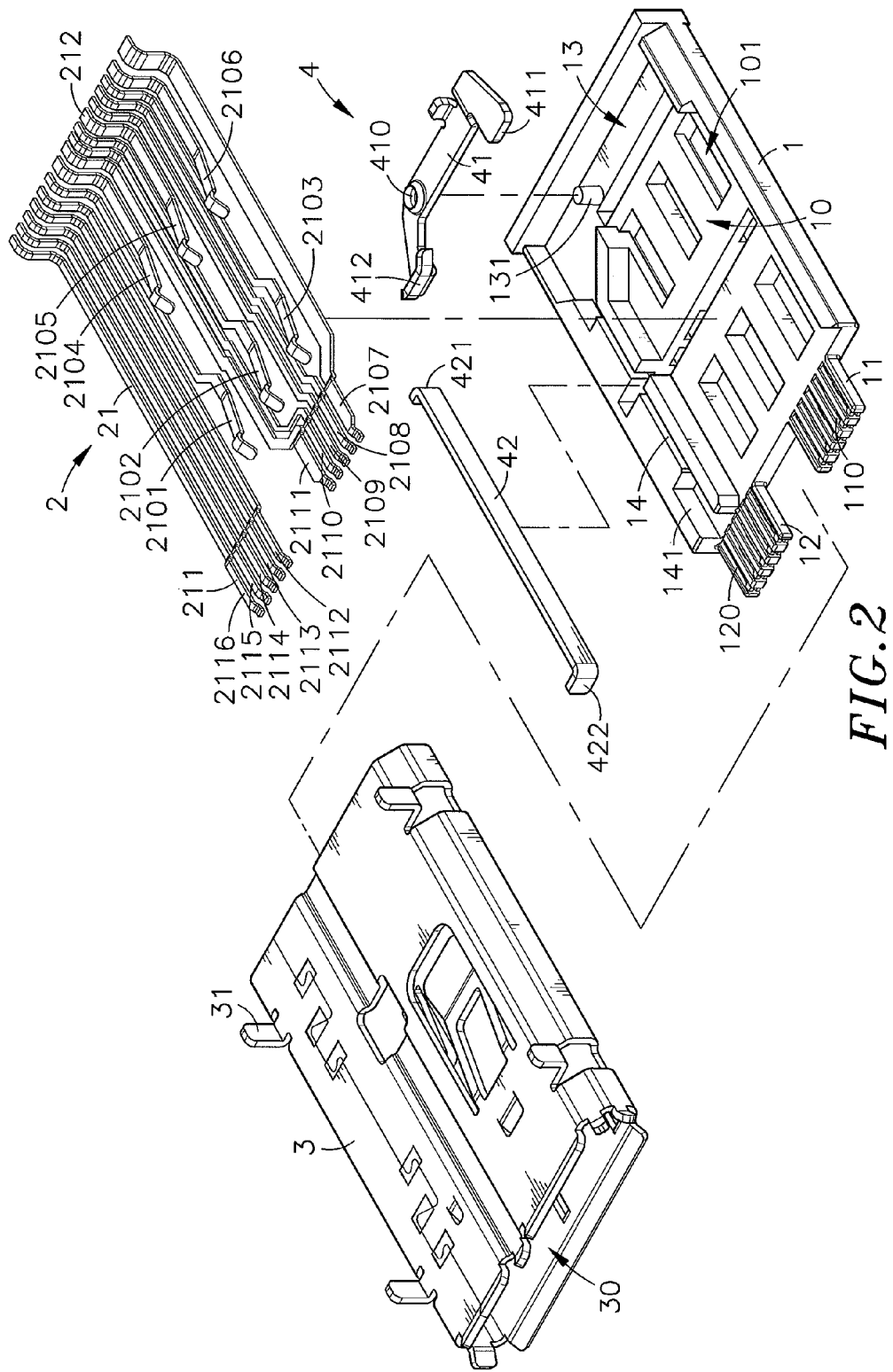
FIG. 2 is an exploded view of the mini USB connector with card plug-in function in accordance with the first embodiment of the present invention.
Figure 3:
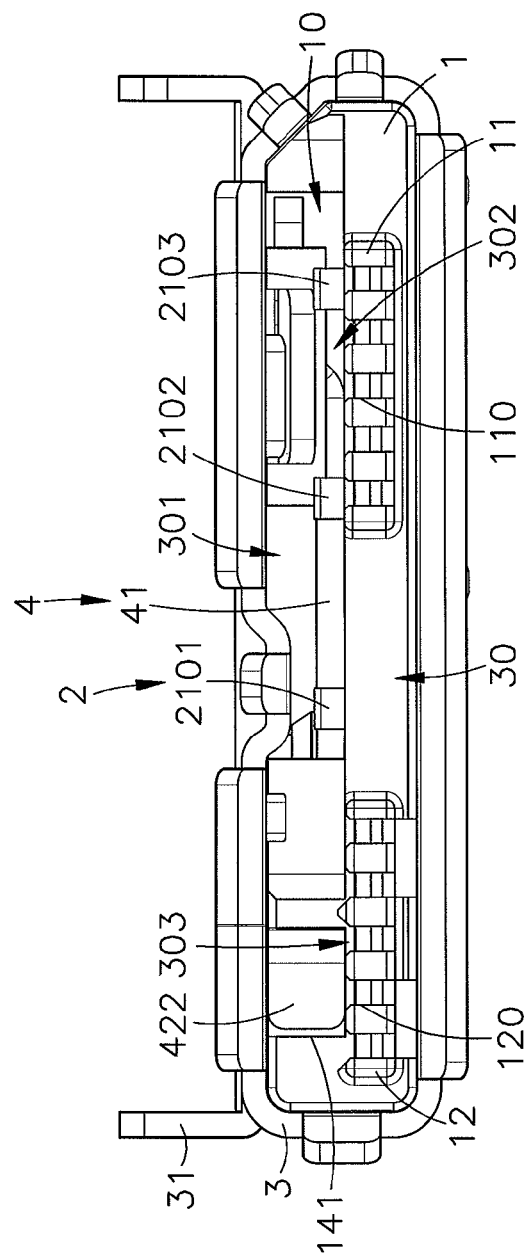
FIG. 3 is a front view of the mini USB connector with card plug-in function in accordance with the first embodiment of the present invention.
Figure 4:
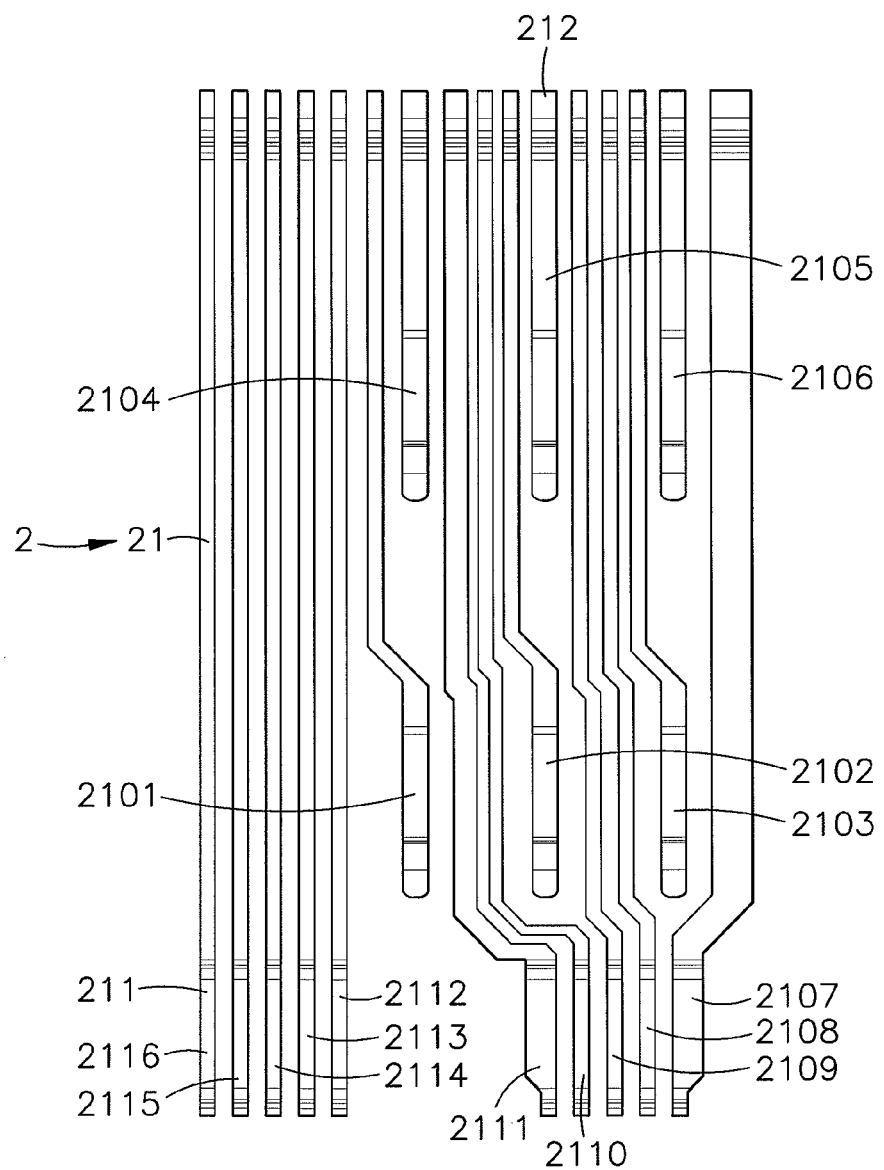
FIG. 4 is a schematic top view of the conducting terminal set of the mini USB connector with card plug-in function in accordance with the first embodiment of the present invention.
Figure 5:
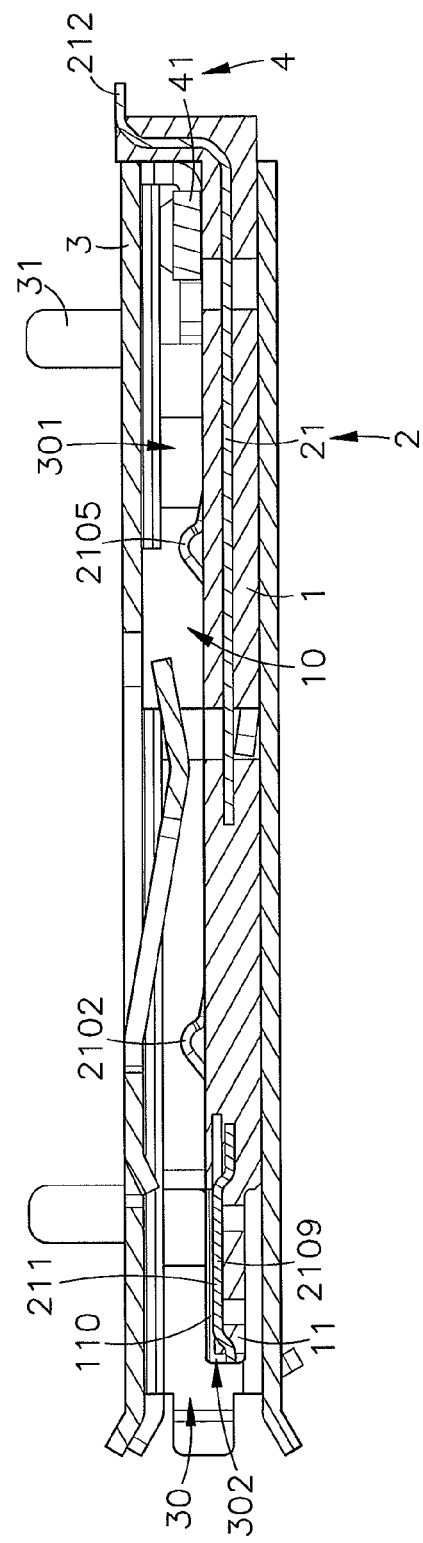
FIG. 5 is a schematic sectional side view of the mini USB connector with card plug-in function in accordance with the first embodiment of the present invention.

Referring to FIGS. 1-5, a mini USB connector with card plug-in function in accordance with a first embodiment of the present invention is shown. As illustrated, the mini USB connector with card plug-in function in accordance with this first embodiment comprises an electrical insulating terminal holder 1, a conducting terminal set 2, and an EMI (electromagnetic interference) shielding shell 3.

The electrical insulating terminal holder 1 comprises an accommodation chamber 10, a plurality of openings 101 cut through a bottom wall of the accommodation chamber 10, a first tongue member 11 and a second tongue member 12 bilaterally disposed in a parallel manner at a front side relative to the accommodation chamber 10, a plurality of first terminal slots 110 longitudinally defined in the first tongue member 11 in a parallel manner, a plurality of second terminal slots 120 longitudinally defined in the second tongue member 12 in a parallel manner, a receiving space 13 transversely disposed at an opposing rear side relative to the accommodation chamber 10, an upright pivot pin 131 located in the receiving space 13, a longitudinal sliding groove 14 extending along one lateral side of the accommodation chamber 10 toward the second tongue member 12, and a recess 141 defined between the longitudinal sliding groove 14 and the second tongue member 12.

The conducting terminal set 2 comprises a plurality of conducting terminals 21. Each conducting terminal 21 has a front end thereof terminating in a curved or flat contact portion 211, and an opposing rear end thereof terminating in a bonding portion 212.

The EMI shielding shell 3 comprises a mating chamber 30 extending through opposing front and rear sides thereof, and a plurality of mounting legs 31 symmetrically extended from two opposite lateral sides thereof.

When assembling the mini USB connector, insert the conducting terminals 21 through the openings 101 to have the contact portions 211 of some conducting terminals 21 be respectively positioned in the first terminal slots 110 in the first tongue member 11 and the second terminal slots 120 in the second tongue member 12 and the contact portions 211 of the other conducting terminals 21 suspend in the accommodation chamber 10, and also to have the bonding portions 212 of all the conducting terminals 21 be arranged in a parallel manner outside a rear side of the electrical insulating terminal holder 1, and then attach the EMI shielding shell 3 to the electrical insulating terminal holder 1 to have the electrical insulating terminal holder 1 and the conducting terminals 21 of the conducting terminal set 2 be accommodated in the mating chamber 30. At this time, the electrical insulating terminal holder 1, the conducting terminal set 2 and the EMI shielding shell 3 are assembled together, forming a mini USB connector, wherein the mating chamber 30 of the EMI shielding shell 3 and the accommodation chamber 10 of the electrical insulating terminal holder 1 constitute a first insertion space 301; the mating chamber 30 and the first tongue member 11 constitute a second insertion space 302; the mating chamber 30 and the second tongue member 12 constitute a third insertion space 303.

Figure 6:
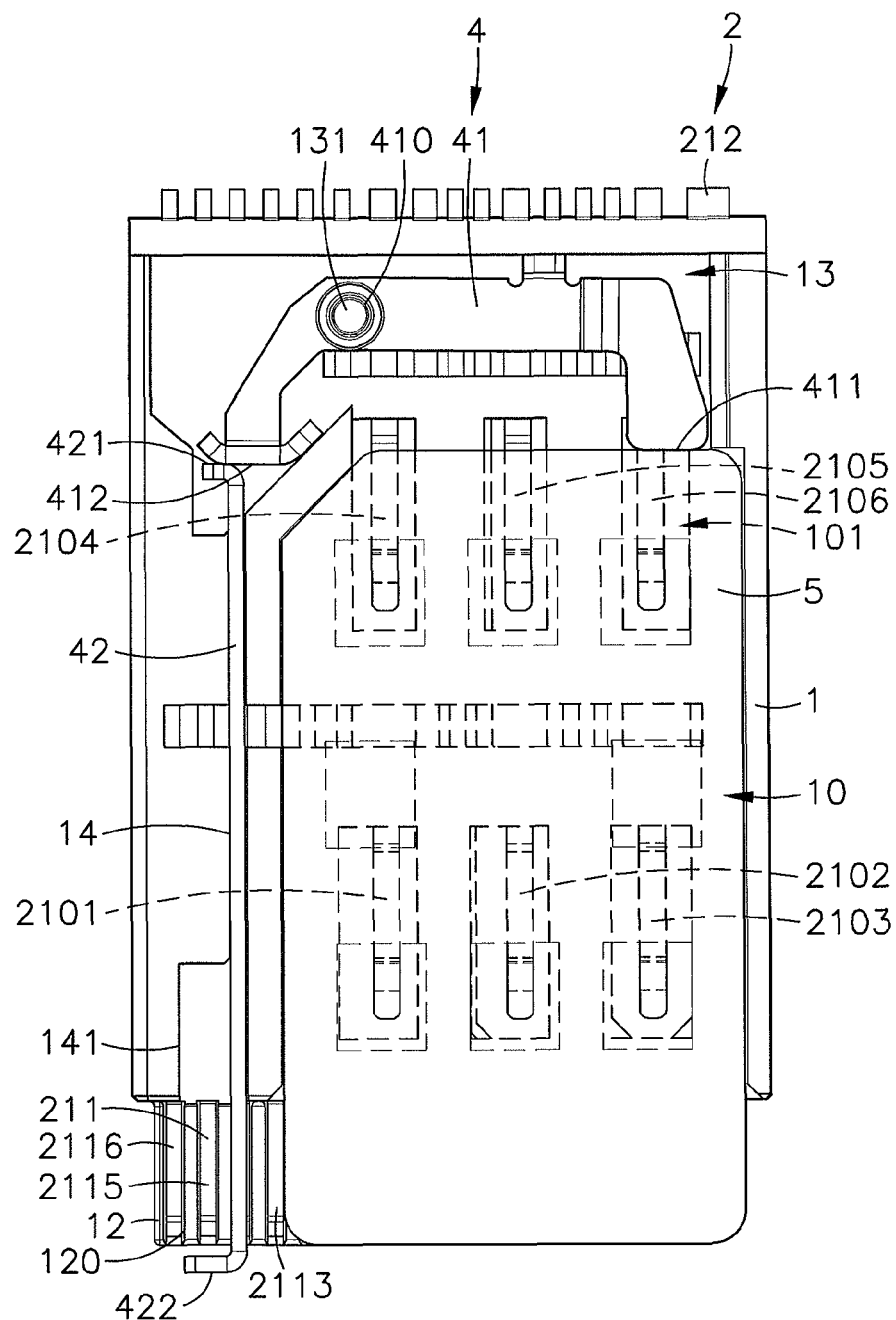
FIG. 6 is a schematic applied view of the first embodiment of the present invention, illustrating an electronic card inserted into the accommodation chamber of the electrical insulating terminal holder.
Figure 7:
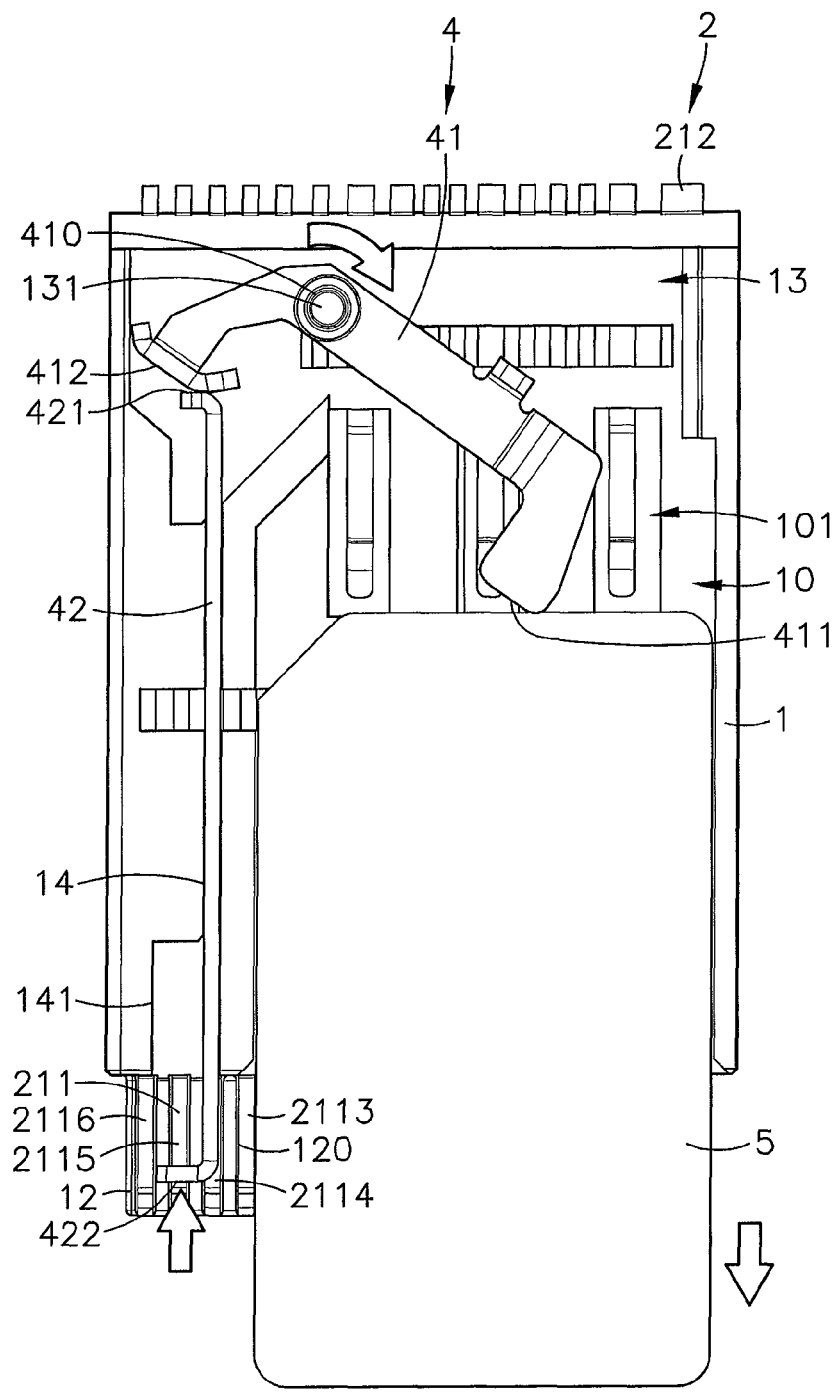
FIG. 7 corresponds to FIG. 6, illustrating the electronic card ejected out of the electrical insulating terminal holder.

Referring to FIGS. 6 and 7 and FIGS. 2-5 again, the mini USB connector further comprises a card ejector mechanism 4 mounted in the receiving space 13 and the longitudinal sliding groove 14. The card ejector mechanism 4 comprises a swinging push bar 41 and a sliding push bar 42. The swinging push bar 41 comprises a push portion 411 perpendicularly extended from one flat end thereof, an upright bearing portion 412 extended from a curved opposite end thereof, and a pivot hole 410 spaced between the push portion 411 and the upright bearing portion 412 and disposed relatively closer to the upright bearing portion 412 and pivotally coupled to the upright pivot pin 131 in the receiving space 13. The sliding push bar 42 is slidably coupled to the longitudinal sliding groove 141 of the electrical insulating terminal holder 1, comprising an actuation portion 421 located at one end thereof and stopped against the upright bearing portion 412 of the swinging push bar 41 and an operating portion 422 perpendicularly extended from an opposite end thereof and movable with the sliding push bar 42 in the recess 141. When the user pushes the operating portion 422 of the sliding push bar 42 of the card ejector mechanism 4 toward the inner end of the recess 141, the actuation portion 421 will be moved toward the inner side of the receiving space 13 against the upright bearing portion 412 of the swinging push bar 41 to turn the swinging push bar 41 about the upright pivot pin 131 in the receiving space 13 and the accommodation chamber 10. When the user inserts a SIM (Subscriber Identity Module) card 5 (nano SIM card or Micro SIM card) into the accommodation chamber 10 of the electrical insulating terminal holder 1 to move the SIM card 5 into contact with the contact portions 211 of respective conducting terminals 21 in the electrical insulating terminal holder 1, a front corner edge of the inserted SIM card will be forced against the push portion 411 of the swinging push bar 41 to turn the swinging push bar 41 about the upright pivot pin 131 in the receiving space 13, causing the upright bearing portion 412 of the swinging push bar 41 to push the actuation portion 421 of the sliding push bar 42 along the longitudinal sliding groove 14 in direction toward the outside of the electrical insulating terminal holder 1 and the EMI shielding shell 3.

When going to reject the inserted SIM card 5 out of the electrical insulating terminal holder 1, press the protruded operating portion 422 of the sliding push bar 42 of the card ejector mechanism 4 in direction toward the inside of electrical insulating terminal holder 1 and the EMI shielding shell 3. At this time, the actuation portion 421 will be moved toward the inner side of the receiving space 13 against the upright bearing portion 412 of the swinging push bar 41 to turn the swinging push bar 41 about the upright pivot pin 131 in the receiving space 13, causing the push portion 411 of the swinging push bar 41 to push the SIM card 5 out of the accommodation chamber 10 of the electrical insulating terminal holder 1.

Further, the conducting terminals 21 of the conducting terminal set 2 are numbered from $1^{st}$ through $16^{th}$. The $1^{st}$ conducting terminal 2101, the $2^{nd}$ conducting terminal 2102, the $3^{rd}$ conducting terminal 2103, the $4^{th}$ conducting terminal 2104, the $5^{th}$ conducting terminal 2105 and the $6^{th}$ conducting terminal 2106 are so configured and arranged such that the contact portions 211 of the conducting terminals from $1^{st}$ through $6^{th}$ are disposed on the middle in two rows and suspending in the accommodation chamber 10; the $7^{th}$ conducting terminal 2107, the $8^{th}$ conducting terminal 2108, the $9^{th}$ conducting terminal 2109, the $10^{th}$ conducting terminal 2110 and the $11^{th}$ conducting terminal 2111 are so configured and arranged such that the contact portions 211 of the conducting terminals from $7^{th}$ through $11^{th}$ are disposed on one lateral side and respectively positioned in the first terminal slots 110 in the first tongue member 11 in a parallel manner; the $12^{th}$ conducting terminal 2112, the $13^{th}$ conducting terminal 2113, the $14^{th}$ conducting terminal 2114, the $15^{th}$ conducting terminal 2115 and the $16^{th}$ conducting terminal 2116 are so configured and arranged such that the contact portions 211 of the conducting terminals from $12^{th}$ through $16^{th}$ are disposed on an opposite lateral side and respectively positioned in the second terminal slots 120 in the second tongue member 12 in a parallel manner. Thus, the contact portions 211 of the $1^{st}$ through $6^{th}$ conducting terminals 2101~2106 fit the first insertion space 301 that is configured to match with a SIM card (nano SIM card or Micro SIM card); the contact portions 211 of the $7^{th}$ through $11^{th}$ conducting terminals 2107~2111 fit the second insertion space 302 that is configured to match with a predetermined micro USB specifications (for example, Micro USB2.0). The $10^{th}$ conducting terminal 2110 is adapted to match with the $9^{th}$ conducting terminal 2109 in fitting USB/OTG specifications. Subject to applications, the $10^{th}$ conducting terminal 2110 can be used as a subsidiary conducting terminal of the $9^{th}$ conducting terminal 2109, or a vacant terminal for Micro USB2.0 or USB OTG (On-The-Go) application. The contact portions 211 of the $12^{th}$ through $16^{th}$ conducting terminals 2112~2116 fit the third insertion space 303 that is configured to match with a predetermined micro USB specifications (for example, Micro USB3.0). Thus, the first insertion space 301, the second insertion space 302 and the third insertion space 303 defined in the electrical insulating terminal holder 1 and the EMI shielding shell 3 can fit different types of electronic cards or electrical connectors for multiple applications. Thus, the mini USB connector of the invention has light, thin, short and small characteristics for a wide range of applications.

Further, after installation of the $1^{st}$ through $16^{th}$ conducting terminals 2101~2116 in the accommodation chamber 10 in insulating terminal holder 1, the bonding portions 212 of the $1^{st}$ through $16^{th}$ conducting terminals 2101~2116 are longitudinally extended out of the rear side of insulating terminal holder 1 for bonding to an external circuit board. Further, the bonding portions 212 of the $1^{st}$ through $16^{th}$ conducting terminals 2101~2116 can be arranged in two rows for bonding to an external circuit board using the mounting method of DIP (dual in-line package). Alternatively, the bonding portions 212 of the $1^{st}$ through $16^{th}$ conducting terminals 2101~2116 can be arranged in one row for bonding to an external circuit board using the mounting method of SMT (Surface-mount technology).

Further, the mounting legs 31 of the EMI shielding shell 3 can be configured in one of harpoon-shaped, frog-leg shaped, fish-eye shaped and seagull leg shaped configurations for bonding to an external circuit board using the mounting method of DIP (dual in-line package). Alternatively, the mounting legs 31 of the EMI shielding shell 3 can be extended in horizontal and configured for bonding to an external circuit board using the mounting method of SMT (Surface-mount technology).

Figure 8:
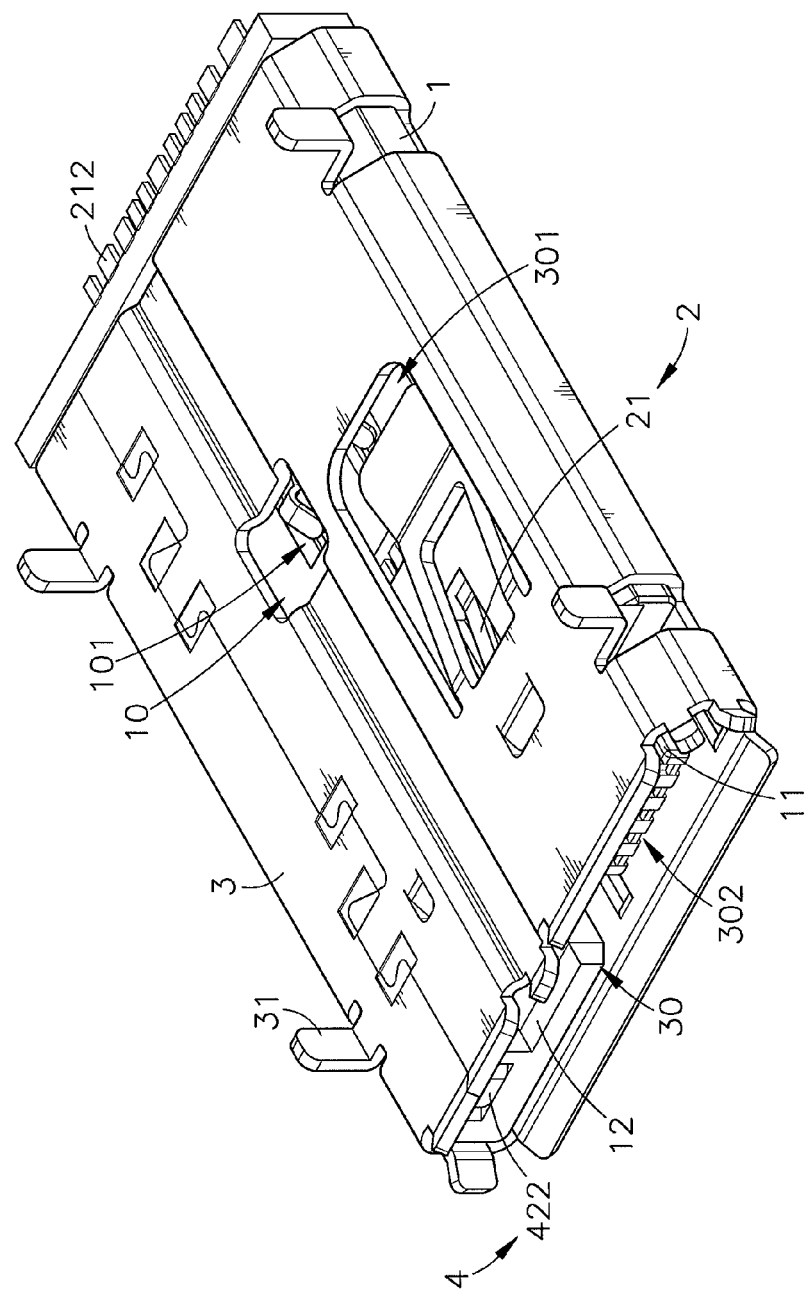
FIG. 8 is an oblique top elevation of a mini USB connector with card plug-in function in accordance with a second embodiment of the present invention.
Figure 9:
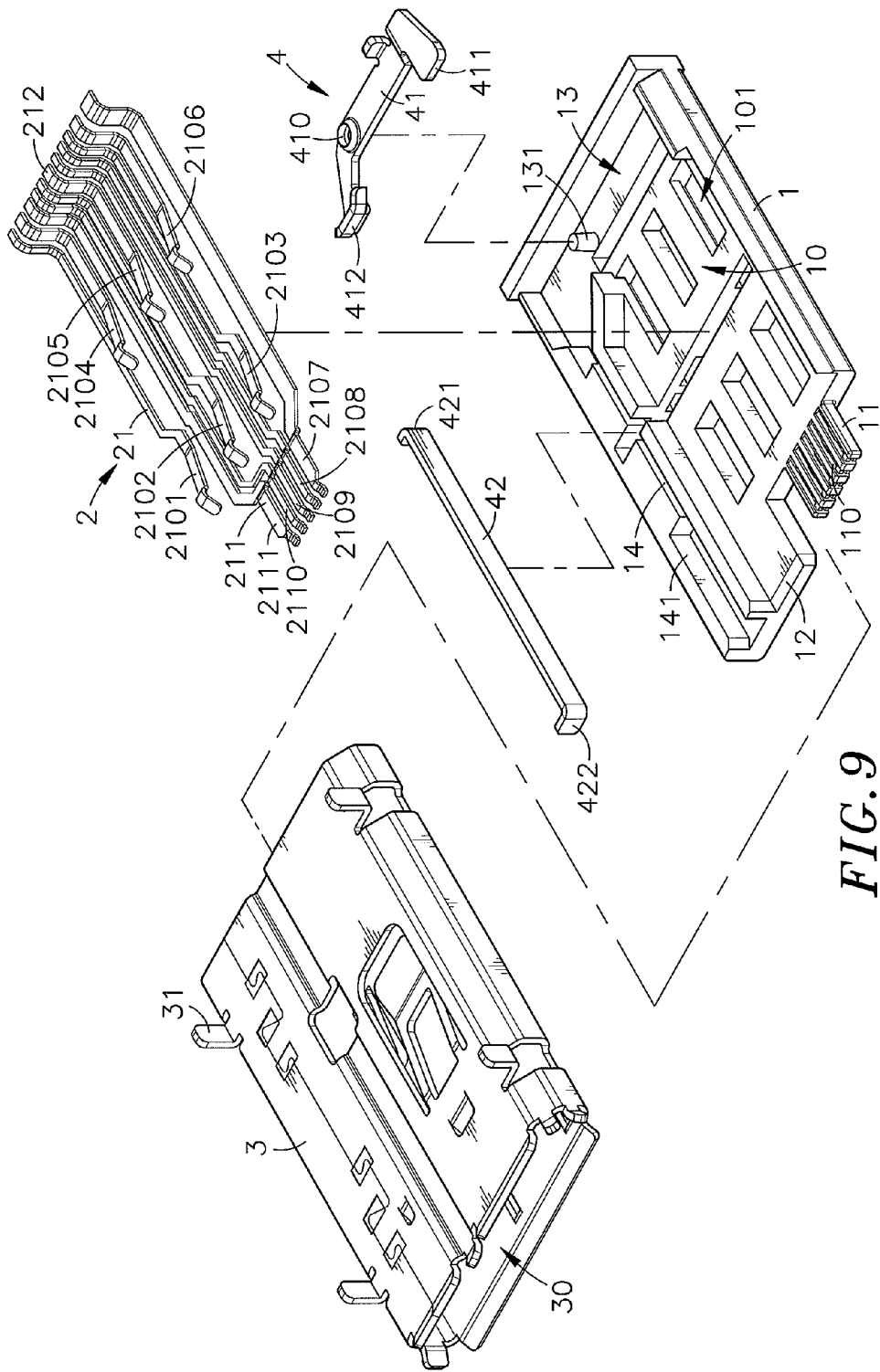
FIG. 9 is an exploded view of the mini USB connector with card plug-in function in accordance with the second embodiment of the present invention.

Referring to FIGS. 8 and 9, a mini USB connector with card plug-in function in accordance with a second embodiment of the present invention is shown. As illustrated, the mini USB connector in accordance with this second embodiment comprises an electrical insulating terminal holder 1, a conducting terminal set 2, and an EMI (electromagnetic interference) shielding shell 3.

The electrical insulating terminal holder 1 comprises an accommodation chamber 10, a plurality of openings 101 cut through a bottom wall of the accommodation chamber 10, a first tongue member 11 disposed at a front side relative to the accommodation chamber 10 near one lateral side of the accommodation chamber 10, a plurality of first terminal slots 110 longitudinally defined in the first tongue member 11 in a parallel manner, a receiving space 13 transversely disposed at an opposing rear side relative to the accommodation chamber 10, an upright pivot pin 131 located in the receiving space 13, a longitudinal sliding groove 14 extending along an opposite lateral side of the accommodation chamber 10, and a recess 141 forwardly extended from the longitudinal sliding groove 14 and having a width larger than the longitudinal sliding groove 14.

The conducting terminal set 2 comprises a plurality of conducting terminals 21, i.e., $1^{st}$ through $11^{th}$ conducting terminals 2101~2111. Each conducting terminal 21 has a front end thereof terminating in a curved or flat contact portion 211, and an opposing rear end thereof terminating in a bonding portion 212.

The EMI shielding shell 3 comprises a mating chamber 30 extending through opposing front and rear sides thereof, and a plurality of mounting legs 31 symmetrically extended from two opposite lateral sides thereof.

When assembling the mini USB connector, insert the conducting terminals 21 through the openings 101 to have the contact portions 211 of the $1^{st}$ through $6^{th}$ conducting terminals 2101~2106 be arranged in two rows and suspending in the accommodation chamber 10, the contact portions 211 of the $7^{th}$ through $11^{th}$ conducting terminals 2109~2111 be positioned in the first terminal slots 110 in the first tongue member 11 and the bonding portions 212 of the $1^{st}$ through $11^{th}$ conducting terminals 2101~2111 be suspending outside the rear side of the insulating terminal holder 1 for bonding to an external circuit board (not shown), and then attach the EMI shielding shell 3 to the electrical insulating terminal holder 1 to have the electrical insulating terminal holder 1 and the conducting terminals 21 of the conducting terminal set 2 be accommodated in the mating chamber 30. At this time, the electrical insulating terminal holder 1, the conducting terminal set 2 and the EMI shielding shell 3 are assembled together, forming a mini USB connector, wherein the mating chamber 30 of the EMI shielding shell 3 and the accommodation chamber 10 of the electrical insulating terminal holder 1 constitute a first insertion space 301; the mating chamber 30 and the first tongue member 11 constitute a second insertion space 302.

The mini USB connector with card plug-in function further comprises a card ejector mechanism 4 mounted in the receiving space 13 and the longitudinal sliding groove 14. The card ejector mechanism 4 comprises a swinging push bar 41 and a sliding push bar 42. The swinging push bar 41 comprises a push portion 411 perpendicularly extended from one flat end thereof, an upright bearing portion 412 extended from a curved opposite end thereof, and a pivot hole 410 spaced between the push portion 411 and the upright bearing portion 412 and disposed relatively closer to the upright bearing portion 412 and pivotally coupled to the upright pivot pin 131 in the receiving space 13. The sliding push bar 42 is slidably coupled to the longitudinal sliding groove 141 of the electrical insulating terminal holder 1, comprising an actuation portion 421 located at one end thereof and stopped against the upright bearing portion 412 of the swinging push bar 41 and an operating portion 422 perpendicularly extended from an opposite end thereof and movable with the sliding push bar 42 in the recess 141. When the user pushes the operating portion 422 of the sliding push bar 42 of the card ejector mechanism 4 toward the inner end of the recess 141, the actuation portion 421 will be moved toward the inner side of the receiving space 13 against the upright bearing portion 412 of the swinging push bar 41 to turn the swinging push bar 41 about the upright pivot pin 131 in the receiving space 13 and the accommodation chamber 10. When the user inserts a SIM (Subscriber Identity Module) card (nano SIM card or Micro SIM card) into the accommodation chamber 10 of the electrical insulating terminal holder 1, a front corner edge of the inserted SIM card will be forced against the push portion 411 of the swinging push bar 41 to turn the swinging push bar 41 about the upright pivot pin 131 in the receiving space 13, causing the upright bearing portion 412 of the swinging push bar 41 to push the actuation portion 421 of the sliding push bar 42 along the longitudinal sliding groove 14 in direction toward the outside of the electrical insulating terminal holder 1 and the EMI shielding shell 3.

As described above, the invention provides a mini USB connector with card plug-in function, wherein the mating chamber 30 of the EMI shielding shell 3 and the accommodation chamber 10 of the electrical insulating terminal holder 1 constitute a first insertion space 301 for the insertion of a predetermined type of micro electronic card; the mating chamber 30 and the first tongue member 11 constitute a second insertion space 302 for the insertion of a predetermined type of electrical connector (for example, Micro USB2.0); the mating chamber 30 and the second tongue member 12 constitute a third insertion space 303 for the insertion of another predetermined type of electrical connector (for example, Micro USB3.0). Thus, a mini USB connector in accordance with the present invention can accept Micro USB2.0 connector, Micro USB3.0 connector, nano SIM card and Micro SIM card for a wide range of applications without causing interference, saving much installation space.

In conclusion, the invention provides a mini USB connector having light, thin, short and small characteristics for a wide range of applications. The mini USB connector with card plug-in function defines therein three insertion spaces, namely, the first insertion space, the second insertion space and the third insertion space to fit different types of electronic cards or electrical connectors (such as nano SIM card, Micro SIM card, Micro USB2.0, Micro USB3.0, etc.) for a wide range of applications.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A mini USB connector, comprising:
an electrical insulating terminal holder comprising an accommodation chamber, and a first tongue member and a second tongue member bilaterally disposed at a front side relative to said accommodation chamber;
a conducting terminal set mounted in said accommodation chamber of said electrical insulating terminal holder, said conducting terminal set comprising a plurality of conducting terminals, each said conducting terminal comprising a contact portion located at one end thereof and a bonding portion located at an opposite end thereof, the contact portions of said conducting terminals being partially disposed to suspend in said accommodation chamber and partially positioned in said first tongue member and said second tongue member, the bonding portions of said conducting terminals being arranged in at least one row to suspend outside a rear side of said electrical insulating terminal holder for bonding to an external circuit board; and
an EMI shielding shell surrounding said electrical insulating terminal holder and said conducting terminals of said conducting terminal set, said EMI shielding shell comprising a mating chamber extending through opposing front and rear sides thereof for accommodating said electrical insulating terminal holder and said conducting terminals of said conducting terminal set, said mating chamber of said EMI shielding shell matching with said accommodation chamber of said electrical insulating terminal holder to constitute a first insertion space, said mating chamber of said EMI shielding shell matching with said first tongue member of said electrical insulating terminal holder to constitute a second insertion space, said mating chamber of said EMI shielding shell matching with said second tongue member of said electrical insulating terminal holder to constitute a third insertion space.

2. A mini USB connector, comprising:
an electrical insulating terminal holder comprising an accommodation chamber, and a first tongue member and a second tongue member bilaterally disposed at a front side relative to said accommodation chamber;
a conducting terminal set mounted in said accommodation chamber of said electrical insulating terminal holder, said conducting terminal set comprising a plurality of conducting terminals numbered from $1^{st}$ through $16^{th}$, each said conducting terminal comprising a contact portion located at one end thereof and a bonding portion located at an opposite end thereof, the contact portions of the conducting terminals from $1^{st}$ through $6^{th}$ being arranged in two rows to suspend in a middle part inside said accommodation chamber, the contact portions of the conducting terminals from $7^{th}$ through $11^{th}$ being positioned in said first tongue member in a parallel manner, the contact portions of the conducting terminals from $12^{th}$ through $16^{th}$ being positioned in said second tongue member in a parallel manner, the bonding portions of the conducting terminals from 1$^{st}$ through 16$^{th}$ being arranged in at least one row outside a rear side of said electrical insulating terminal holder for bonding to an external circuit board; and an EMI shielding shell surrounding said electrical insulating terminal holder and said conducting terminals of said conducting terminal set, said EMI shielding shell comprising a mating chamber extending through opposing front and rear sides thereof for accommodating said electrical insulating terminal holder and said conducting terminals of said conducting terminal set, said mating chamber of said EMI shielding shell matching with said accommodation chamber of said electrical insulating terminal holder to constitute a first insertion space for the insertion of a predetermined type of electronic card, said mating chamber of said EMI shielding shell matching with said first tongue member of said electrical insulating terminal holder to constitute a second insertion space for the insertion of a Micro USB2.0 connector, said mating chamber of said EMI shielding shell matching with said second tongue member of said electrical insulating terminal holder to constitute a third insertion space for the insertion of a Micro USB3.0 connector.

3. The Mini USB connector as claimed in claim 2, wherein said first insertion space is configured for the insertion of a nano SIM card or Micro SIM card.

4. The Mini USB connector as claimed in claim 2, further comprising a card ejector mechanism mounted in said electrical insulating terminal holder and operable to eject an inserted electronic card out of said electrical insulating terminal holder.

5. The Mini USB connector as claimed in claim 4, wherein said electrical insulating terminal holder further comprises a receiving space transversely defined near an opposing rear side relative to said accommodation chamber, an upright pivot pin located in said receiving space, a longitudinal sliding groove extending along one lateral side of said accommodation chamber toward said second tongue member, and a recess defined between said longitudinal sliding groove and said second tongue member; said card ejector mechanism comprises a swinging push bar and a sliding push bar, said swinging push bar comprising a push portion perpendicularly extended from one flat end thereof, an upright bearing portion extended from a curved opposite end thereof, and a pivot hole spaced between said push portion and said upright bearing portion and pivotally coupled to said upright pivot pin in said receiving space, said sliding push bar being slidably coupled to said longitudinal sliding groove of said electrical insulating terminal holder, said sliding push bar comprising an actuation portion located at one end thereof and stopped against said upright bearing portion of said swinging push bar and an operating portion perpendicularly extended from an opposite end thereof and movable with said sliding push bar in said recess.

6. The Mini USB connector as claimed in claim 4, wherein the bonding portions of said conducting terminals are selectively arranged for bonding to an external circuit board using one of the mounting method of DIP (dual in-line package) and the mounting method of SMT (Surface-mount technology).

7. The Mini USB connector as claimed in claim 4, wherein said EMI shielding shell further comprises a plurality of mounting legs configured for bonding to a predetermined circuit board, enabling the mini USB connector to be installed in said predetermined circuit board to form a sink board-mounting structure, on-board mounting structure, under-the-board mounting structure or raised mounting structure.

8. The Mini USB connector as claimed in claim 4, wherein said EMI shielding shell further comprises a plurality of mounting legs configured in one of harpoon-shaped, frog-leg shaped, fish-eye shaped and seagull leg shaped configurations for bonding to an external circuit board using the mounting method of DIP (dual in-line package).

9. The Mini USB connector as claimed in claim 4, wherein said EMI shielding shell further comprises a plurality of mounting legs extended in horizontal and configured for bonding to an external circuit board using the mounting method of SMT (Surface-mount technology).

10. A mini USB connector, comprising:

an electrical insulating terminal holder comprising an accommodation chamber, and a first tongue member laterally disposed at a front side relative to said accommodation chamber;

a conducting terminal set mounted in said accommodation chamber of said electrical insulating terminal holder, said conducting terminal set comprising a plurality of conducting terminals numbered, each said conducting terminal comprising a contact portion located at one end thereof and a bonding portion located at an opposite end thereof, the contact portions of one part of said conducting terminal set being arranged in two rows to suspend in said accommodation chamber, the contact portions of the other part of said conducting terminal set being positioned in said first tongue member in a parallel manner, the bonding portions of said conducting terminals from being arranged in at least one row outside a rear side of said electrical insulating terminal holder for bonding to an external circuit board; and an EMI shielding shell surrounding said electrical insulating terminal holder and said conducting terminals of said conducting terminal set, said EMI shielding shell comprising a mating chamber extending through opposing front and rear sides thereof for accommodating said electrical insulating terminal holder and said conducting terminals of said conducting terminal set, said mating chamber of said EMI shielding shell matching with said accommodation chamber of said electrical insulating terminal holder to constitute a first insertion space for the insertion of a predetermined type of electronic card, said mating chamber of said EMI shielding shell matching with said first tongue member of said electrical insulating terminal holder to constitute a second insertion space for the insertion of a Micro USB connector.

11. The mini USB connector as claimed in claim 10, wherein said conducting terminals of said conducting terminal set is numbered from 1$^{st}$ through 11$^{th}$, the contact portions of the conducting members from 1$^{st}$ through 6$^{th}$ being arranged in two rows to suspend in said accommodation chamber and to match with said first receiving space, the contact portions of the conducting members from 7$^{th}$ through 11$^{th}$ being positioned in said first tongue member in a parallel manner to match with said second receiving space.

* * * * *